(12) United States Patent
Brebion (10) Patent No.: US 9,988,198 B2
(45) Date of Patent: Jun. 5, 2018

(54) OVENABLE HEAT-SEALED PACKAGE

(75) Inventor: Herve Brebion, Simpsonville, SC (US)

(73) Assignee: Cryovac, Inc., Charlotte, NC (US)

( * ) Notice: Subject to any disclaimer, the term of this patent is extended or adjusted under 35 U.S.C. 154(b) by 808 days.

(21) Appl. No.: 13/813,244

(22) PCT Filed: Jul. 22, 2011

(86) PCT No.: PCT/US2011/044929
§ 371 (c)(1),
(2), (4) Date: Jan. 30, 2013

(87) PCT Pub. No.: WO2012/027043
PCT Pub. Date: Mar. 1, 2012

(65) Prior Publication Data
US 2014/0183084 A1  Jul. 3, 2014

Related U.S. Application Data

(60) Provisional application No. 61/402,072, filed on Aug. 23, 2010.

(51) Int. Cl.
*B32B 1/02* (2006.01)
*B65D 81/34* (2006.01)
(Continued)

(52) U.S. Cl.
CPC ............ *B65D 81/343* (2013.01); *B29C 65/18* (2013.01); *B29C 66/112* (2013.01); *B29C 66/1122* (2013.01); *B29C 66/131* (2013.01); *B29C 66/133* (2013.01); *B29C 66/135* (2013.01); *B29C 66/24244* (2013.01); *B29C 66/431* (2013.01); *B29C 66/53461* (2013.01);
(Continued)

(58) Field of Classification Search
CPC .. B32B 27/34; B32B 1/02; B32B 7/02; B65D 77/2024; B29C 65/18; Y10T 428/1352
USPC ................... 428/34.1, 34.2, 35.7, 35.9, 36.9
See application file for complete search history.

(56) References Cited

U.S. PATENT DOCUMENTS 3,369,911 A  2/1968  von Witzleben et al.
3,762,986 A  10/1973  Bhuta et al.
(Continued)

FOREIGN PATENT DOCUMENTS

DE  19935324 A1  2/2001
EP  0229527 A2  7/1987
(Continued)

OTHER PUBLICATIONS

"Additives with Dual Function" Dr. K. Hausmann, Addcon 2002, Oct. 22-23, 2002), 38 Pages.
(Continued)

*Primary Examiner* — Marc A Patterson
(74) *Attorney, Agent, or Firm* — Daniel B. Ruble (57) ABSTRACT

A package comprises a heat seal between a first film and a second film. The first film comprises at least 70% of one or more polyamides. The first film also comprises at least one modified layer comprising (1) at least 70% of one or more polyamides and (2) one or more modifiers selected from ethylene/alkyl(meth)acrylate copolymers, ethylene/(meth) acrylic acid copolymers, and ionomers. The second film comprises at least 70%) of one or more polyamides. The package is useful under ovenable conditions.

2 Claims, 5 Drawing Sheets

(51) Int. Cl.
| | |
|---|---|
| *B32B 27/08* | (2006.01) |
| *B32B 27/34* | (2006.01) |
| *B32B 7/02* | (2006.01) |
| *B65D 77/20* | (2006.01) |
| *B29C 65/18* | (2006.01) |
| *B29C 65/00* | (2006.01) |
| *B32B 1/08* | (2006.01) |
| *B31B 160/10* | (2017.01) |
| *B31B 150/00* | (2017.01) |
| *B31B 70/02* | (2017.01) |
| *B31B 70/64* | (2017.01) |

(52) U.S. Cl.
CPC ............ *B29C 66/549* (2013.01); *B29C 66/71* (2013.01); *B29C 66/81427* (2013.01); *B29C 66/8322* (2013.01); *B32B 7/02* (2013.01); *B32B 27/08* (2013.01); *B32B 27/34* (2013.01); *B65D 77/2024* (2013.01); *B29C 66/4312* (2013.01); *B29C 66/4322* (2013.01); *B29C 66/73115* (2013.01); *B29C 66/73715* (2013.01); *B31B 70/022* (2017.08); *B31B 70/642* (2017.08); *B31B 2150/00* (2017.08); *B31B 2160/10* (2017.08); *B32B 2250/24* (2013.01); *B32B 2270/00* (2013.01); *B32B 2307/308* (2013.01); *B32B 2307/31* (2013.01); *B32B 2307/734* (2013.01); *B32B 2439/00* (2013.01); *B32B 2439/40* (2013.01); *B32B 2439/70* (2013.01); *B65D 81/3453* (2013.01); *B65D 81/3461* (2013.01)

(56) References Cited

U.S. PATENT DOCUMENTS

| | | | |
|---|---|---|---|
| 3,843,479 | A | 10/1974 | Matsunami et al. |
| 3,995,084 | A | 11/1976 | Berger et al. |
| 4,355,721 | A | 10/1982 | Knott, II et al. |
| 4,400,429 | A | 8/1983 | Barlow et al. |
| 4,421,823 | A | 12/1983 | Theisen et al. |
| 4,448,792 | A | 5/1984 | Schirmer |
| 4,495,249 | A | 1/1985 | Ohya et al. |
| 4,537,304 | A | 8/1985 | Kaim et al. |
| 4,542,075 | A | 9/1985 | Schirmer |
| 4,568,922 | A | 2/1986 | Schwippert et al. |
| 4,605,460 | A | 8/1986 | Schirmer |
| 4,606,922 | A | 8/1986 | Schirmer |
| 4,647,483 | A | 3/1987 | Tse et al. |
| 4,665,135 | A | 5/1987 | Tse et al. |
| 4,740,377 | A | 4/1988 | Dawes et al. |
| 4,766,018 | A | 8/1988 | Hinrichsen et al. |
| 4,803,122 | A | 2/1989 | Schirmer |
| 4,855,103 | A | 8/1989 | Ekbom |
| 4,855,183 | A | 8/1989 | Oberle |
| 4,877,684 | A | 10/1989 | Shepard et al. |
| 4,892,765 | A | 1/1990 | Hisazumi et al. |
| 4,925,685 | A | 5/1990 | Sahi |
| 4,935,272 | A | 6/1990 | Leboeuf |
| 4,937,112 | A | 6/1990 | Schirmer |
| 4,970,113 | A | 11/1990 | Yamada |
| 5,016,735 | A | 5/1991 | Hodge |
| 5,037,683 | A | 8/1991 | Schirmer |
| 5,061,532 | A | 10/1991 | Yamada |
| 5,089,073 | A | 2/1992 | Schirmer |
| 5,185,189 | A | 2/1993 | Stenger et al. |
| 5,206,309 | A | 4/1993 | Altman |
| 5,281,360 | A | 1/1994 | Hong et al. |
| 5,314,987 | A | 5/1994 | Kim et al. |
| 5,344,679 | A | 9/1994 | Vicik |
| 5,374,459 | A | 12/1994 | Mumpower et al. |
| 5,460,878 | A | 10/1995 | Hostetter |
| 5,462,756 | A | 10/1995 | Raines et al. |
| 5,480,690 | A | 1/1996 | Stenger et al. |
| 5,534,277 | A | 7/1996 | Ramesh et al. |
| 5,547,765 | A | 8/1996 | Degrassi et al. |
| 5,709,915 | A | 1/1998 | Tomic et al. |
| 5,718,101 | A | 2/1998 | Noel et al. |
| 5,866,214 | A | 2/1999 | Ramesh |
| 5,866,649 | A | 2/1999 | Hong et al. |
| 5,926,989 | A | 7/1999 | Oliver, Sr. |
| 6,110,600 | A | 8/2000 | Ramesh |
| 6,221,410 | B1 | 4/2001 | Ramesh et al. |
| 6,239,210 | B1 | 5/2001 | Kim et al. |
| 6,270,882 | B1 | 8/2001 | Eggers et al. |
| 6,288,161 | B1 | 9/2001 | Kim et al. |
| 6,346,285 | B1 | 2/2002 | Ramesh |
| 6,379,812 | B1 | 4/2002 | Hofmeister et al. |
| 6,416,832 | B1 | 7/2002 | Uehara et al. |
| 6,436,547 | B1 | 8/2002 | Toft et al. |
| 6,627,324 | B1 | 9/2003 | Eggers et al. |
| 6,979,494 | B2 | 12/2005 | Berrier et al. |
| 7,504,158 | B2 | 3/2009 | Berrier et al. |
| 7,919,161 | B2 | 4/2011 | Ebner et al. |
| 2002/0001684 | A1 | 1/2002 | Kim et al. |
| 2002/0128386 | A1 | 9/2002 | Montanari et al. |
| 2003/0134966 | A1 | 7/2003 | Kim et al. |
| 2003/0173550 | A1 | 9/2003 | Fox et al. |
| 2004/0043233 | A1* | 3/2004 | Berrier et al. ............ 428/474.7 |
| 2004/0185156 | A1 | 9/2004 | Garwood |
| 2004/0242737 | A1 | 12/2004 | Topulos |
| 2005/0155066 | A1 | 7/2005 | Lee |
| 2006/0008678 | A1 | 1/2006 | Fukushima et al. |
| 2006/0155066 | A1 | 7/2006 | Crevecoeur et al. |
| 2006/0292387 | A1 | 12/2006 | Kuhmann et al. |
| 2007/0026250 | A1 | 2/2007 | Hofmeister et al. |
| 2008/0021138 | A1 | 1/2008 | Liang et al. |
| 2008/0070023 | A1 | 3/2008 | Topoulos |
| 2008/0090953 | A1 | 4/2008 | Elkovitch et al. |
| 2009/0017247 | A1 | 1/2009 | Ballet et al. |
| 2009/0047491 | A1 | 2/2009 | Scully et al. |
| 2009/0080812 | A1 | 3/2009 | Schmal et al. |
| 2009/0081417 | A1 | 3/2009 | Schmal et al. |
| 2009/0209696 | A1 | 8/2009 | Lee et al. |
| 2009/0314375 | A1 | 12/2009 | Flat et al. |
| 2010/0323069 | A1 | 12/2010 | Rubinstein |
| 2011/0236540 | A1 | 9/2011 | Owensby et al. |

FOREIGN PATENT DOCUMENTS

| | | | |
|---|---|---|---|
| EP | 0231663 | B1 | 8/1987 |
| EP | 0315409 | A2 | 5/1989 |
| EP | 0315419 | A2 | 5/1989 |
| EP | 0338488 | B1 | 10/1989 |
| EP | 0366382 | A1 | 5/1990 |
| EP | 0564338 | A1 | 10/1993 |
| EP | 0795482 | A2 | 9/1997 |
| EP | 0821037 | A1 | 1/1998 |
| EP | 0960903 | A2 | 12/1999 |
| EP | 1172202 | A1 | 1/2002 |
| WO | 199215641 | | 9/1992 |
| WO | 199301108 | | 1/1993 |
| WO | WO-95/15992 | * | 6/1995 |
| WO | 199704959 | | 2/1997 |
| WO | 199712758 | | 4/1997 |
| WO | 199728047 | | 8/1997 |
| WO | 199806574 | | 2/1998 |
| WO | 199933653 | | 7/1999 |
| WO | 200189830 | A1 | 11/2001 |
| WO | 2002072347 | A2 | 9/2002 |
| WO | 2006053297 | A1 | 5/2006 |
| WO | 2006084259 | A1 | 8/2006 |
| WO | 2012027043 | A1 | 3/2012 |

OTHER PUBLICATIONS

New Ethylene Acrylate Copolymers Try Out for Impact-Modifier Roles, Sherman, Lili Manosis, Plastics Technology, Nov. 1, 2001, 2 Pages.

(56) References Cited

OTHER PUBLICATIONS

"Polyamide Impact Modification-Different Modifiers for Different Toughness Requirements" K. Hausman (DuPont Presentation), Dec. 2002, 37 Pages.

* cited by examiner

OVENABLE HEAT-SEALED PACKAGE

This application claims priority from and the benefit of U.S. Provisional Patent Application Ser. No. 61/402,072 filed Aug. 23, 2010, which is incorporated herein in its entirety by reference.

BACKGROUND

The present disclosure relates to heat sealed packaging useful in applications requiring a high degree of dimensional stability at elevated oven temperatures.

For the convenience of consumers, packaged food may be designed to be placed directly in a microwave or conventional oven to heat or cook the food without first removing the packaging. The consumer thus avoids having to handle the raw product or to clean a container in which the food would have otherwise been placed for cooking or heating. The consumer may also simply dispose of the packaging material after heating or cooking the food.

Packaging that can withstand exposure to the heating and/or cooking environment of a selected type of oven is said to be "ovenable" with respect to that type of oven. To be ovenable with respect to a microwave oven, the packaging should not, for example, include materials such as metals that reflect microwaves to cause arcing or otherwise damage the oven's microwave generation. To be ovenable with respect to a conventional oven, the packaging should be able in use to withstand exposure to an elevated temperature (e.g., 375° F. or 400° F. air temperature) for an extended period of time (e.g., three hours) while maintaining desired performance attributes. Packaging that is ovenable both with respect to a microwave oven and a conventional oven is said to be "dual-ovenable."

Ovenable packaging may subjected to handling and loading forces associated with distribution of the package, which begins almost as soon as the package has been created. For example, such forces may be encountered by the packaging before the polyamide present in the packaging film of the package has had the opportunity to equilibrate with ambient moisture (i.e., humidity). It is desirable that such forces not cause leaks or other failures in the packaging.

SUMMARY

A package comprises a heat seal between a first film and a second film. The first film comprises at least 70% by weight of the first film of one or more polyamides. The first film also comprises at least one modified layer comprising (1) at least 70% by weight of the modified layer of one or more polyamides and (2) one or more modifiers selected from ethylene/alkyl(meth)acrylate copolymers, ethylene/(meth)acrylic acid copolymers, and ionomers. The second film comprises at least 70% by weight of the second film of one or more polyamides.

These and other objects, advantages, and features of various embodiments of the disclosed subject matter will be more readily understood and appreciated by reference to the detailed description of the invention and the drawings.

DETAILED DESCRIPTION

In one or more embodiments of the presently disclosed subject matter, a package comprises a first film and a second film having a heat seal between the first film to the second film.

First and Second Films

The first film and/or the second film may comprise one or more polyamides (e.g., any one or more of the polyamides described herein) in an amount of at least, and/or at most, any of the following amounts based on the weight of the film: 70%, 80%, 90%, 95%, 96%, and 98%. The second film may comprise 100% polyamide, may consist of one or more polyamides, or may consist essentially of one or more polyamides.

Any of the layers of the first film and/or the second film (e.g., any of the modified layers or other layers described herein) may comprise one or more polyamides (e.g., any one or more of the polyamides described herein) in an amount of at least, and/or at most, any of the following amounts based on the weight of the layer: 70%, 80%, 90%, 95%, 96%, and 98%. Any layer of the first and/or second films, other than a modified layer as described herein, may comprise 100% polyamide, may consist of one or more polyamides, or may consist essentially of one or more polyamides.

The first film and/or the second film may comprise one or more modifiers (i.e., any one or more of the modifiers selected from ethylene/alkyl(meth)acrylate copolymers, ethylene/(meth)acrylic acid copolymers, and ionomers as described herein) in an amount of at least, and/or at most, any of the following amounts based on the weight of the film: 0.5, 1, 2, 4, 6, 8, 10, 12, 14, 16, 18, 20, 22, 24, 26, 28, and 30%. Any of the layers of the first film and/or the second film may comprise one or more modifiers (i.e., any one or more of the modifiers described herein) in an amount of at least, and/or at most, any of the following amounts based on the weight of the layer: 0.5, 1, 2, 4, 6, 8, 10, 12, 14, 16, 18, 20, 22, 24, 26, 28, and 30%.

Any of the first and/or second films may comprise less than any of the following amounts of polyolefin (based on the weight of the film) other than the modifier copolymers described herein: 20%, 15%, 10%, 5%, 3%, 2%, and 1%; and the amount of polyolefin, other than the modifier copolymers described herein, in the first and/or second films may range between any two of these values (e.g., from 2% to 15%). The first and second films may be substantially free of polyolefin other than the modifier copolymers described herein.

Any of the first and/or second films may comprise less than any of the following amounts of polyester (based on the weight of the film): 20%, 15%, 10%, 5%, 3%, 2%, and 1%; and the amount of polyester in any of the first and/or second films may range between any two of these values (e.g., from 2% to 15%). Any of the first and/or second films may be substantially free of polyester.

The first film and/or the second film may have any of the following number of layers: only one layer (in which case the one layer is the first film), at least one layer, only two layers, at least two layers, only three layers, at least three layers, at least four layers, at most nine layers, and at most five layers. As used herein, the term "layer" refers to a discrete film component which is coextensive with the film and has a substantially uniform composition. Where two or more adjacent layers have essentially the same composition, then these two or more adjacent layers may be considered a single layer for the purposes of this application.

The thickness of any of the first and/or second films may be at least, and/or at most, any of the following: 1, 1.5, 2, 4, 6, 8, 10, 12 mils.

Polyamide

Useful polyamides include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

$$H_2N(CH_2)_nNH_2$$

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4'diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

$$HOOC—Z—COOH$$

where Z is representative of a divalent aliphatic radical containing at least 2 carbon atoms. Representative examples include adipic acid (i.e., hexanedioic acid), sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(-aminobutyric acid) ("nylon-4"), poly(-aminohexanoic acid) ("nylon-6" or "poly(caprolactam)"), poly(7-aminoheptanoic acid) ("nylon-7"), poly(-aminooctanoic acid) ("nylon-8"), poly(-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/9, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least 50%, at least 60%, at least 70%, at least 80%, and at least 90%, and the ranges between any of the forgoing values (e.g., from 60 to 80%); and may include the second most prevalent polymer unit in the copolymer (e.g., caprolactam as a polymer unit in the copolymer nylon-6,6/6) in mole percentages ranging from any of the following: less than 50%, less than 40%, less than 30%, less than 20%, less than 10%, and the ranges between any of the forgoing values (e.g., from 20 to 40%).

Useful polyamides include those that are approved by the controlling regulating agency (e.g., the U.S. Food and Drug Agency) for either direct contact with food and/or for use in a food packaging film, at the desired conditions of use.

Ethylene/Alkyl(meth)acrylate Copolymer Modifier

The modifier may comprise one or more ethylene/alkyl (meth)acrylate copolymers. ("Copolymer" as used in this application means a polymer derived from two or more types of monomers, and includes terpolymers, etc.) The modifier ethylene/alkyl(meth)acrylate copolymer is a copolymer of ethylene and one or more monomers of alkyl esters of acrylic or methacrylic acid (collectively, "alkyl(meth) acrylate"), where the esters have from 4 to 12 carbon atoms. Representative examples of the "alkyl(meth)acrylate" group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl(meth) acrylate monomer may have from any of 4 to 8 carbon atoms, from 4 to 6 carbon atoms, and from 4 to 5 carbon atoms.

The alkyl(meth)acrylate comonomer content of the ethylene/alkyl(meth)acrylate copolymer as modifier may be at least any of, and/or at most any of, 3, 6, 8, 12, 15, 18, 20, 22, 23, 24, 30, and 40%, based on the weight of the copolymer. The ethylene comonomer content of the ethylene/alkyl(meth)acrylate copolymer as modifier may be at least, and/or at most, any of the following: 60, 82, 85, 88, 92, 93, 94, and 97%, based on the weight of the copolymer.

Representative examples of ethylene/alkyl(meth)acrylate copolymer as modifier include ethylene/methyl acrylate, ethylene/methyl methacrylate, ethylene/ethyl acrylate, ethylene/ethyl methacrylate, ethylene/butyl acrylate, and ethylene/2-ethylhexyl methacrylate.

The ethylene/alkyl(meth)acrylate copolymer modifier may be made in a traditional high-pressure autoclave, or may be made using tubular reactor technology to complete the copolymerization. The latter method produces ethylene/alkyl(meth)acrylate copolymer that is somewhat more heterogeneous, having higher melting points for a given alkyl (meth)acrylate comonomer content than that made using the traditional autoclave process. The modifier ethylene/alkyl (meth)acrylate copolymer made using the tubular reactor technology may have any of the following: a methyl acrylate comonomer content of at least 18 wt. % and a melting temperature of at least 92° C., a methyl acrylate comonomer content of at least 20 wt. % and a melting temperature of at least 90° C., an ethyl acrylate comonomer content of at least 15 wt. % and a melting temperature of at least 95° C., a butyl acrylate comonomer content of at least 15 wt. % and a melting temperature of at least 95° C., a butyl acrylate comonomer content of at least 25 wt. % and a melting temperature of at least 92° C., and a butyl acrylate comonomer content of at least 32 wt. % and a melting temperature of at least 88° C. Such ethylene/alkyl(meth)acrylate copolymers are available, for example, from DuPont Corporation under the Evaloy AC trade name.

Ethylene/(meth)acrylic Acid Copolymer Modifier

The modifier may comprise one or more ethylene/(meth) acrylic acid copolymers. The modifier ethylene/(meth) acrylic acid copolymer is a copolymer of ethylene and one or more monomers selected from acrylic acid and methacrylic acid (collectively, "(meth)acrylic acid").

The (meth)acrylic acid comonomer content of the ethylene/(meth)acrylic acid copolymer as modifier may be at least any of, and/or at most any of, 3, 6, 8, 12, 15, 18, 20, 22, 23, 24, 30, and 40%, based on the weight of the copolymer. The ethylene comonomer content of the ethylene/(meth)acrylic acid copolymer as modifier may be at least, and/or at most, any of the following: 60, 82, 85, 88, 92, 93, 94, and 97%, based on the weight of the copolymer.

Ionomer Modifier

The modifier may comprise one or more ionomers. Ionomer is a copolymer of ethylene and an unsaturated carboxylic acid (such as acrylic acid or methacrylic acid) having the carboxylic acid groups at least partially neutralized by a metal ion, such as sodium or zinc. Useful ionomer modifiers include those in which sufficient metal ion is present to neutralize from 15% to 60% of the acid groups in the ionomer. Useful ionomer modifiers include those having any of at least 50 weight % and at least 80 weight % ethylene units. Useful ionomer modifiers also include those having from 1 to 20 weight percent acid units. Useful ionomer modifiers are available, for example, from DuPont Corporation under the Surlyn trade name.

Modified Layers

The first film comprises at least one modified layer (i.e., one or more modified layers). A modified layer as used herein refers to a layer comprising one or more modifiers selected from ethylene/alkyl(meth)acrylate copolymers, ethylene/(meth)acrylic acid copolymer, and ionomers. Any of one or more the layers of the first film may be a modified layer. The first film may comprise any of at least one modified layer, only one modified layer (in which case the one modified layer is the first film), only two modified layers, at least two modified layers, only three modified layers, and at least three modified layers.

The second film may comprise at least one (i.e., one or more) modified layers. Any of one or more the layers of the second film may be a modified layer. The second film may comprise any of at least one modified layer, only one modified layer (in which case the one modified layer is the second film), only two modified layers, at least two modified layers, only three modified layers, and at least three modified layers.

Any of the modified layers may have at least, and/or at most, of any of the following amounts of any of one or more the modifiers described herein: 0.5, 1, 2, 4, 6, 8, 10, 12, 14, 16, 18, 20, 22, 24, 26, 28, and 30%, based on the weight of the modifier layer. Alternatively, the second film may not be modified, such that the second film does not comprise any of the modifier described herein.

The thickness of a modified layer as a percentage of the total thickness of the film comprising the modified layer may be at least any of the following values: 40%, 50%, 60%, 70%, 80%, and 90%; and may range between any of the forgoing values (e.g., from 40% to 90%).

Layers

Figure 8:
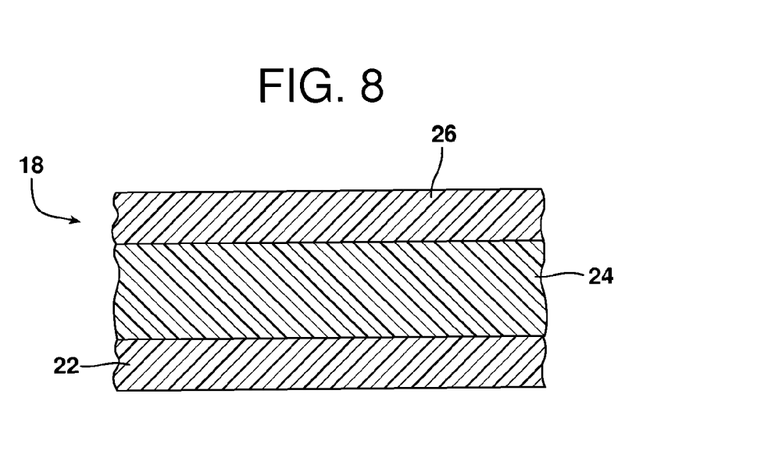
FIG. 8 is a representational cross-section of film 12.

If the first and/or second films have more than one layer, then the following terminology may be used with respect to the layers. A layer may be an "interior layer" of a film if the layer has both surfaces directly adhered to other layers of the film. A layer may be an "outer layer" of a film if the layer forms an outer surface of the film. An "outside layer" is the outer layer of a film that is or is intended to be adjacent the space outside of a package comprising the film. An "inside layer" of a film is the outer layer of the film that is or is intended to be adjacent the space inside of a package comprising the film. A sealant layer is an outer layer of a film that is adapted to facilitate the heat-sealing of the film to itself or to another object, such as another film. A sealant layer may also be an inside layer of the film. Any of the interior, outer, outside, inside, and sealant layers may be modified layers as described herein. An exemplary first film 18 comprises sealant layer 22, interior layer 24, and outside layer 26. (FIG. 8.)

The first film and/or the second film may comprise one or more modified interior layers, that is one or more interior layers having any of the compositions or other attributes described herein with respect to modified layers. The first film and/or the second film may comprise a modified sealant layer, that is a sealant layer having any of the compositions or other attributes described herein with respect to modified layers. The first film and/or the second film may comprise a modified inside layer, that is an inside layer having any of the compositions or other attributes described herein with respect to modified layers. The first film and/or the second film may comprise a modified outside layer, that is an outside layer having any of the compositions or other attributes described herein with respect to modified layers.

Each of the modified, interior, outer, outside, inside, and sealant layers may independently have any of at least, and/or at most, the following thicknesses: 0.5, 1, 1.5, 2, 2.5, 3, 4, 5, 7, 8, and 10 mils.

Sealant Layer

The first and/or second films may comprise a sealant layer. The sealant layer may comprise more than one polyamide such as a blend of polyamides, for example, two polyamides, at least two polyamides, three polyamides, and at least three polyamides. The sealant layer may comprise a first polyamide in any of the following amounts (based on the weight of the sealant layer): at least 40%, at least 50%, at least 60%, at least 70%, at least 80%, at least 90%, at least 95%, and the ranges between any of these forgoing values (e.g., from 60 to 80%).

The sealant layer may comprise a second polyamide in any of the following amounts (based on the weight of the sealant layer): less than 60%, less than 50%, less than 40%, less than 30%, less than 20%, less than 10%, and less than 5%, and the ranges between any of these forgoing values (e.g., from 20 to 40%).

The sealant layer may comprise a third polyamide in any of the following amounts (based on the weight of the sealant layer): less than 60%, less than 50%, less than 40%, less than 30%, less than 20%, less than 10%, and less than 5%, and the ranges between any of these forgoing values (e.g., from 20 to 40%).

Each of the first, second, and third polyamides of the sealant layer may be selected from any of the polyamides described above, for example, nylon-6, nylon-6,6, nylon-6,12, nylon-6/6,6, nylon-6,6/6,10, and nylon-6,I/6,T. The sealant layer may comprise, for example, any of the following combinations: nylon-6 and nylon-6,6/6,10; nylon-6 and nylon-6,I/6,T; nylon6/6,6 and nylon-6,6/6,10; nylon-6,6 and nylon-6,12; nylon-6, nylon-6,6/6,10, and nylon-6,I/6,T; and nylon-6, nylon-6,12, and nylon-6,I/6,T.

The sealant layer may have a melting point less than any of the following values: 220° C., 210° C., 200° C., 190° C., and 180° C.; and the melting point of the sealant layer may be at least any of the following values: 120° C., 130° C., 140° C., and 150° C. All references to the melting point of a polymer, a resin, or a film layer in this application refer to the melting peak temperature of the dominant melting phase of the polymer, resin, or layer as determined by differential scanning calorimetry according to ASTM D-3418.

If the sealant layer comprises amorphous material, then the sealing layer may not clearly display a melting point. The glass transition temperature for the sealing layer may be less than, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%. All references to the glass transition temperature of a polymer, a resin, or a film layer in this application refer to the characteristic temperature at which glassy or amorphous polymers become flexible as determined by differential scanning calorimetry (DSC) according to ASTM D-3417.

The sealant layer may comprise a polyamide blend comprising one or more relatively high-melting point polyamides with one or more relatively low-melting point polyamides. The sealant layer may comprise such a polyamide blend in at least any of the following amounts based on the weight of the sealant layer: 70%, 80%, 90%, and 95%. The relatively high-melting point polyamides may have a melting point of at least any of the following values: 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., and 300° C.; and may range between any of the forgoing values (e.g., from 235 to 280° C.). Representative relatively high-melting point polyamides may include nylon-6, nylon-6,6, nylon-6/6,6, nylon-6,10, nylon-6,12, nylon-6/6,T, nylon-MXD,6, nylon-4,6, nylon-6,9, and nylon-6,6/6,10 (having less than about 10% or more than 60% nylon-6,6 in the copolymer).

The relatively low-melting point polyamides may have a melting point of less than any of the following values: 210° C., 205° C., 200° C., 195° C., 190° C., 185° C., and 180° C. Representative relatively low-melting point polyamides may include nylon-6/12, nylon-12, nylon-12,T, nylon-6/6,9, nylon-11, and nylon-6,6/6,10 (having from 10% to 60% nylon-6,6 in the copolymer).

The amount of relatively high-melting point polyamide in the polyamide blend of relatively high-melting point polyamide with relatively low-melting point polyamide may be at least about, may be less than about, and may range between any of the following amounts (based on the weight of the blend): 1%, 5%, 10%, 10%, 20%, 30%, 40%, and 50%. The amount of relatively low-melting point polyamide in the blend of relatively high-melting point polyamide with relatively low-melting point polyamide may be at least about, may be less than about, and may range between any of the following amounts (based on the weight of the blend): 50%, 60%, 70%, 80%, 90%, 95%, and 99%.

The sealant layer may comprise a polyamide blend comprising two or more relatively low-melting point polyamides. The sealant layer may comprise such a polyamide blend in at least any of the following amounts based on the weight of the sealant layer: 70%, 80%, 90%, and 95%.

The sealant layer may comprise one or more amorphous polyamides, for example, nylon-6,I/6,T. The sealant layer may comprise amorphous polyamide in an amount at least about, at most about, and ranging between any of the following values (based on the weight of the sealant layer): 20%, 30%, 40%, 50%, 60%, 70%, and 80%.

The thickness of the sealant layer may be selected to provide sufficient material to effect a strong heat seal bond, yet not so thick so as to negatively affect the ovenable characteristics of the film to an unacceptable level. The sealant layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The sealant layer may have a thickness less than any of the following values: 5 mils, 4 mils, 3 mils, 2 mils, 1 mil, 0.7 mils, 0.5 mils, and 0.3 mils. The thickness of the sealant layer as a percentage of the total thickness of the film may be less that any of the following values: 50%, 40%, 30%, 25%, 20%, 15%, 10%, and 5%; and may range between any of the forgoing values (e.g., from 10% to 30%).

Second Layer of the Film

The first and/or second films may comprise another layer, that is a second layer, in addition to the sealant layer. The second film may be modified as described herein. The second layer may be, for example, any of an interior layer and an outside layer. The second layer may comprise one or more polyamides such as any of those discussed above in any of the following amounts based on the weight of the second layer: at least 70%, at least 80%, at least 90%, at least 95%, at least 96%, and at least 98%. Further, the second layer may consist of one or more polyamides, or may consist essentially of one or more polyamides.

The second layer may comprise more than one polyamide such as a blend of polyamides, for example, two polyamides, at least two polyamides, three polyamides, and at least three polyamides. The second layer may comprise a first polyamide of at least about, and between about, any of the following amounts (based on the weight of the second layer): 60%, 70%, 80%, and 90%. The second layer may comprise a second polyamide of less than about, and between about, any of the following amounts (based on the weight of the second layer): 50%, 40%, 30%, 20%, and 10%.

Each of the first and second polyamides of the second layer may be selected from, for example, nylon-6, nylon-6,6, nylon-6/6,6, nylon-6,10, nylon-6,12, nylon-6,6/6,10, nylon-6/6,T, nylon-MXD,6, and nylon-4,6. The second layer may comprise any of nylon-6, nylon-6,6, and nylon-6/6,6, and combinations thereof, such as both nylon-6 and nylon-6,6 or both nylon-6 and nylon-6,6/6,10.

The second layer may comprise one or more amorphous polyamides, for example, nylon-6,I/6,T. The second layer may comprise amorphous polyamide in an amount at least about, at most about, and ranging between any of the following values (based on the weight of the second layer): 10%, 20%, 30%, 40%, 50%, 60%, 70%, and 80%.

To enhance the high-temperature performance of the first and/or second films, the second layer may have a melting point of at least any of the following values: 210° C., 220° C., 230° C., 240° C., 250° C., 260° C., 270° C., 280° C., 290° C., and 300° C.; and may range between any of these forgoing values.

The glass transition temperature for the second layer may be less than about, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%.

The second layer may have a melting point greater than the melting point of the sealant layer by at least any of the following values: 5° C., 10° C., 15° C., 20° C., 30° C., 40° C., 50° C., 60° C., 70° C., 80° C., 90° C., and 100° C.

The second layer may comprise a polyamide blend comprising two or more relatively high-melting point polyamides, such as those discussed above with respect to the sealant layer.

The amount of relatively high-melting point polyamide in the polyamide blend of the second layer may be at least, and may range between, any of the following amounts (based on the weight of the blend): 30%, 40%, 50%, 60%, 70%, 80%, 90%, 95%, 100%.

The thickness of second layer may be selected to provide sufficient material to enhance the ovenable characteristics of the film. The second layer may have a thickness of at least any of the following values: 0.5 mils, 0.7 mils, 1 mil, 2 mils, 3 mils, 4 mils, and 5 mils. The second layer may have a thickness less than any of the following values: 10 mils, 6 mils, 5 mils, 4 mils, and 3 mils. The thickness of the second layer as a percentage of the total thickness of the film may be at least any of the following values: 40%, 50%, 60%, 70%, 80%, and 90%; and may range between any of the forgoing values (e.g., from 40% to 90%).

Other Layers of the Film

The first and/or second films may include one or more additional layers. The additional layers may comprise any of the materials, and in any of the amounts, discussed above with respect to the sealant and second layers.

The additional layers may comprise, for example, one or more barrier components. Useful barrier components include: ethylene/vinyl alcohol copolymer ("EVOH"), polyacrylonitrile ("PAN"), and polyamide, for example, nylon-MXD,6 (either with or without nanocomposite), nylon-MXD,6/MXD,I.

EVOH may have an ethylene content of, for example, between 20% and 45%, between 25% and 35%, and 32% by weight. EVOH may include saponified or hydrolyzed ethylene/vinyl acetate copolymers, such as those having a degree of hydrolysis of at least 50%, preferably of at least 85%. EVOH may be a retortable grade EVOH, such as those available from Nippon Goshei.

The additional layer comprising a barrier component may have a thickness and composition sufficient to impart to the film incorporating the barrier layer an oxygen transmission rate of no more than any of the following values: 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

An additional layer may comprise barrier component in an amount of at least any of the following: 50%, 60%, 70%, 80%, 90%, and 100%, based on the weight of the additional layer comprising the barrier component. The thickness of an additional layer may be any of the following: from 0.05 to 6 mils, from 0.05 to 4 mils, from 0.1 to 3 mils, and from 0.12 to 2 mils.

Additives

Any of the layers and/or any of the polyamide resins or blends may comprise effective amounts of one or more nucleating agents. Effective amounts and types of nucleating agents are known to those of skill in the art.

Any of the layers and/or any of the polyamide resins or blends may comprise effective amounts of one or more heat stabilizers. Effective amounts and types of heat stabilizers are known to those of skill in the art. The layer may comprise at least any of the following amounts of heat stabilizer: 0.2%, 0.5%, 0.8%, 1%, 1.3%, 1.5%, 2%, 2.5%, 3%, 4%, and 5%, and may range between any of those values (e.g., from 0.5% to 3%).

Any of the layers and/or any of the polyamide resins or blends may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

Appearance Characteristics

Haze is a measurement of the transmitted light scattered more than 2.5° from the axis of the incident light. Haze is measured against the outside surface 16 or 18 of the film (FIGS. 1 to 4), according to the method of ASTM D 1003, which is incorporated herein in its entirety by reference. All references to "haze" values in this application are by this standard. The haze of the film may be no more than any of the following values: 20%, 15%, 10%, 9%, 8%, 7%, 6%, 5%, 4%, 3%, and 1%. Any of the first and/or second films may have any of these haze values after a representative sample of the film is placed for two hours in a conventional oven having an air temperature of 400° F.

The first and/or second films may be transparent (at least in the non-printed regions) so that the packaged article is visible through the film. "Transparent" as used herein means that the material transmits incident light with negligible scattering and little absorption, enabling objects (e.g., packaged food or print) to be seen clearly through the material under typical unaided viewing conditions (i.e., the expected use conditions of the material). The transparency (i.e., clarity) of the film may be at least any of the following values: 20%, 25%, 30%, 40%, 50%, 65%, 70%, 75%, 80%, 85%, and 95%, as measured in accordance with ASTM D1746. All references to "transparency" values in this application are by this standard.

Shrink Attribute

Any of the first and/or second films may have a heat-shrinkable attribute. For example, the film may have a free shrink in at least one direction (i.e., machine or transverse direction) or in at least each of two directions (machine and transverse directions) measured at 220° F. of at least any of the following: 3%, 7%, 10%, 15%, 20%, 25%, 30%, 40%, 50%, 55%, 60%, and 65%. Further, the films may have any of a free shrink in at least one direction (machine or transverse direction) or in at least each of two directions (machine and transverse directions) of at least any of these listed shrink values when measured at any of 100° F., 120° F., 140° F., 160° F., 185° F., 190° F., 200° F., and 210° F. Unless otherwise indicated, each reference to free shrink in this application means a free shrink determined by measuring the percent dimensional change in a 10 cm×10 cm specimen when subjected to selected heat (i.e., at a certain temperature exposure) according to ASTM D 2732.

Manufacture of the Films

The first and/or second films may be manufactured by thermoplastic film-forming processes known in the art (e.g., tubular or blown-film extrusion, coextrusion, extrusion coating, flat cast extrusion, annular cast extrusion). A combination of these processes may also be employed. For example, the film may be made using any of a "double bubble" or "triple bubble" extrusion processes.

The first and/or second films may be oriented or non-oriented. The film may be oriented in either the machine (i.e., longitudinal) or the transverse direction, or in both directions (i.e., biaxially oriented), for example, in order to enhance the optics, strength, and durability of the film. For example, the film may be oriented in one of the machine or transverse directions or in both of these directions by at least any of the following ratios: 2:1, 2.5:1, 2.7:1, 3:1, 3.5:1, and 4:1. The film may be oriented in one of the machine or transverse directions or in both of these directions by no more than any of the following ratios: 10:1, 9:1, 8:1, 7:1, 6:1, 5:1, and 4:1. If the film is oriented, then it may be heat set or annealed after orientation to reduce the heat shrink attribute to a desired level or to help obtain a desired crystalline state of the film. For example, the first and/or second films may be made using a tenterframe process.

Package

Figure 1:
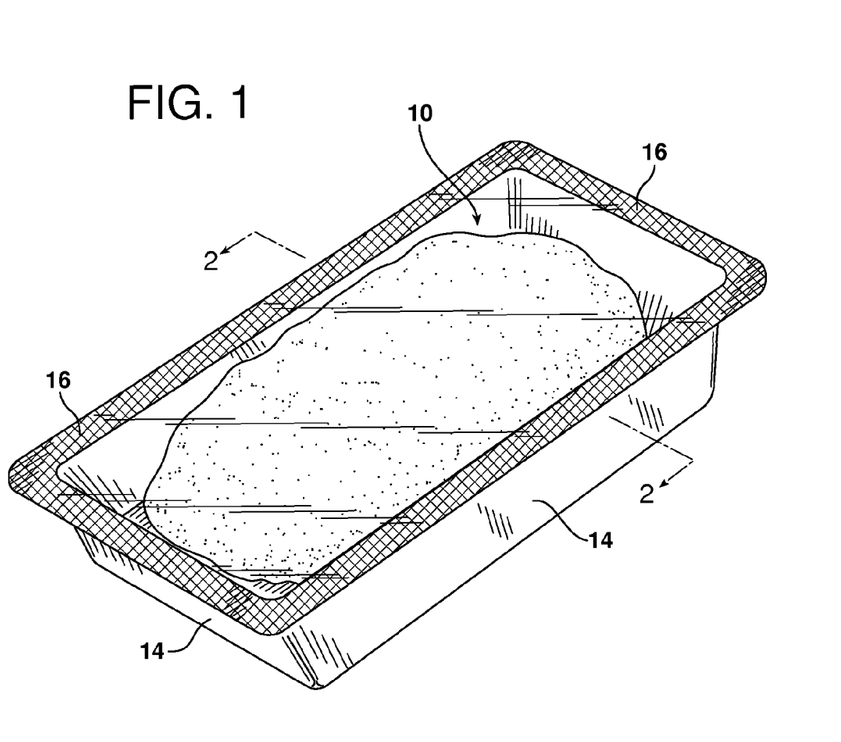
FIG. 1 is a representational peripheral view of package 10.
Figure 2:
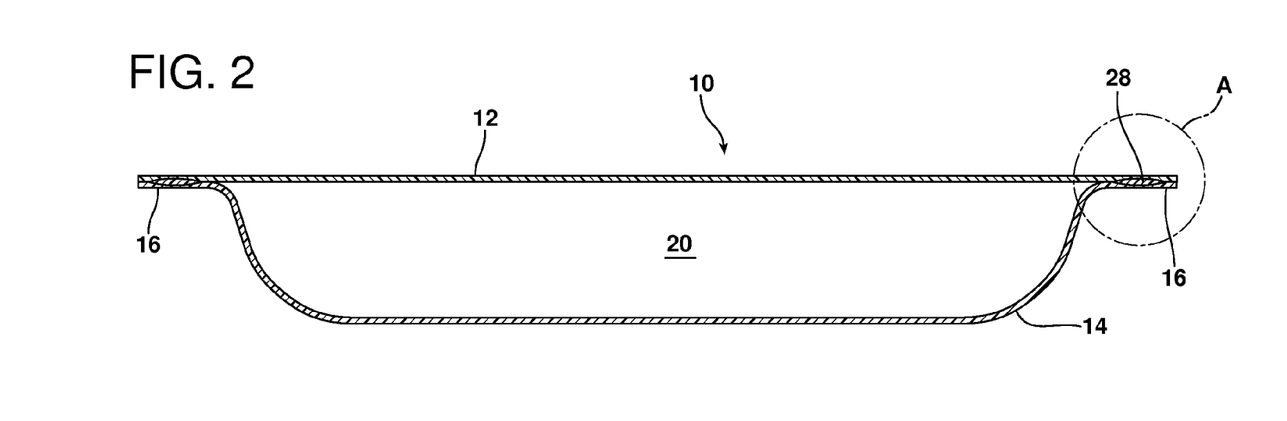
FIG. 2 is a representational cross-sectional view taken along line 2-2 of FIG. 1.
Figure 3:
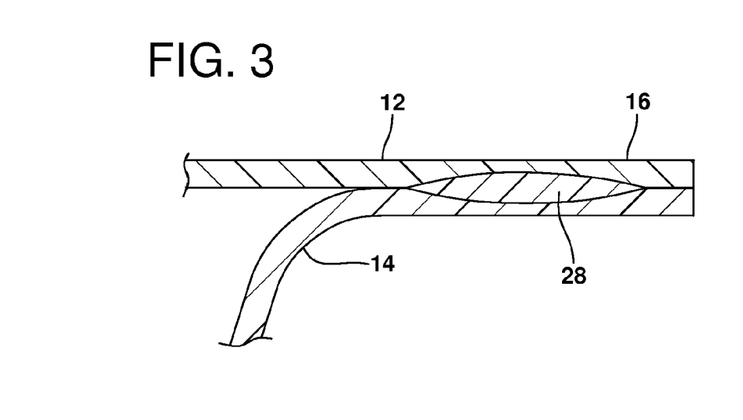
FIG. 3 is a detailed representational view taken for region A of FIG. 2.

An exemplary package 10 has heat seal 28 between and connecting the first film 12 and the second film 14 in selected heat seal regions 16 to enclose packaging space 20. (FIGS. 1-3.) A heat sealing operation to form heat seal 28 uses a heat sealing unit operation, such as any of thermal conductance sealing, impulse sealing, ultrasonic sealing, and dielectric sealing. For example, a heat sealing machine having a heated seal platen (i.e., bar) contacts and compresses the two films to be heat sealed together for a sufficient amount of time so that the heated seal platen transfers heat from the seal platen to soften at least a portion of the films (e.g., the sealing layers of the films) so that they may be melded together to create heat seal 28.

Figure 4:
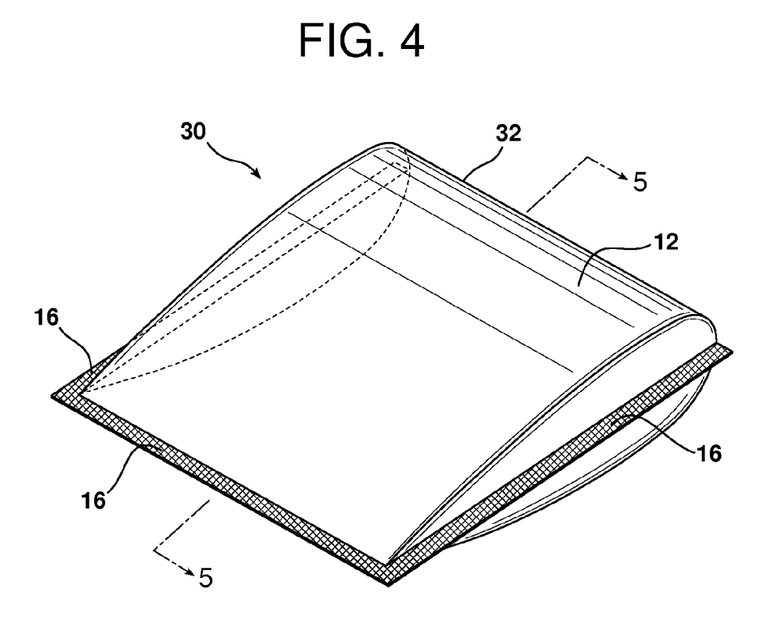
FIG. 4 is a representational peripheral view of package 30.
Figure 5:
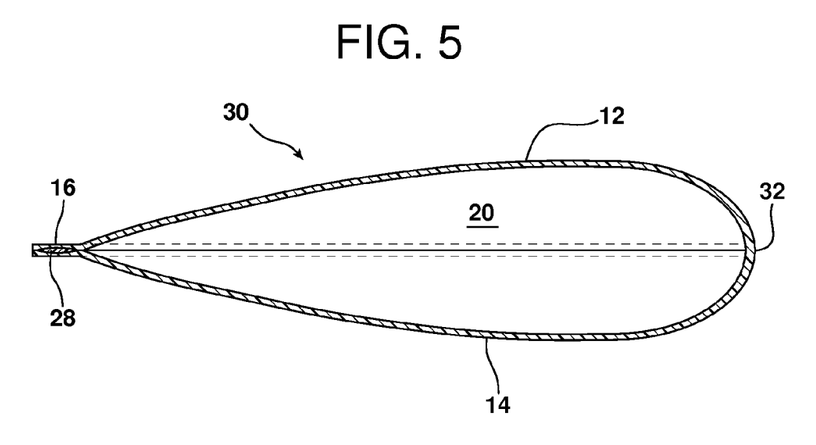
FIG. 5 is a representational cross-sectional view taken along line 5-5 of FIG. 4.
Figure 6:
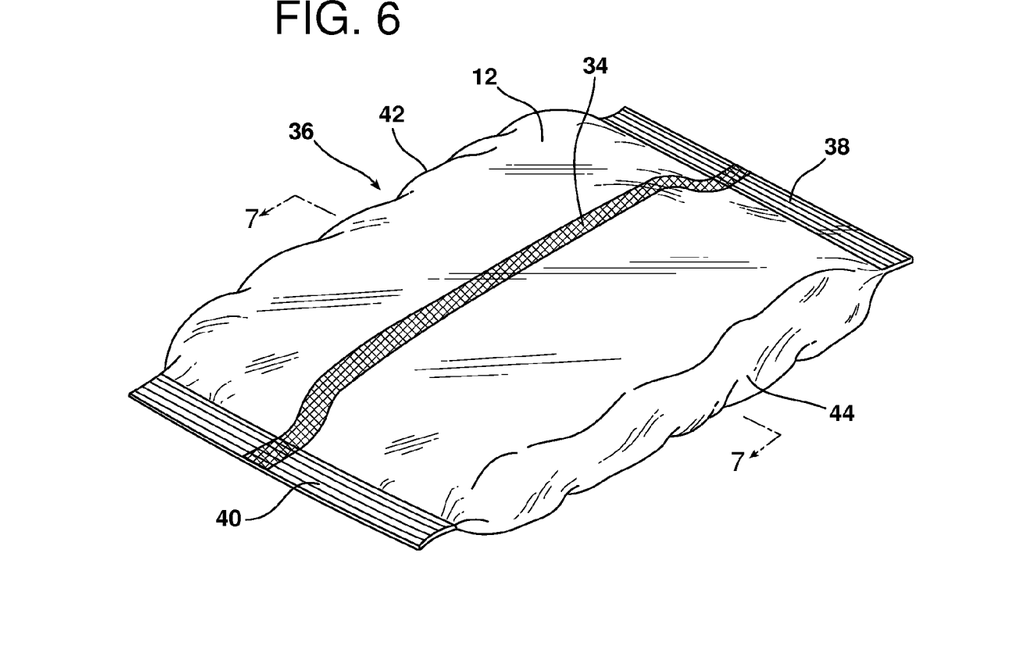
FIG. 6 is a representational peripheral view of package 36.
Figure 7:
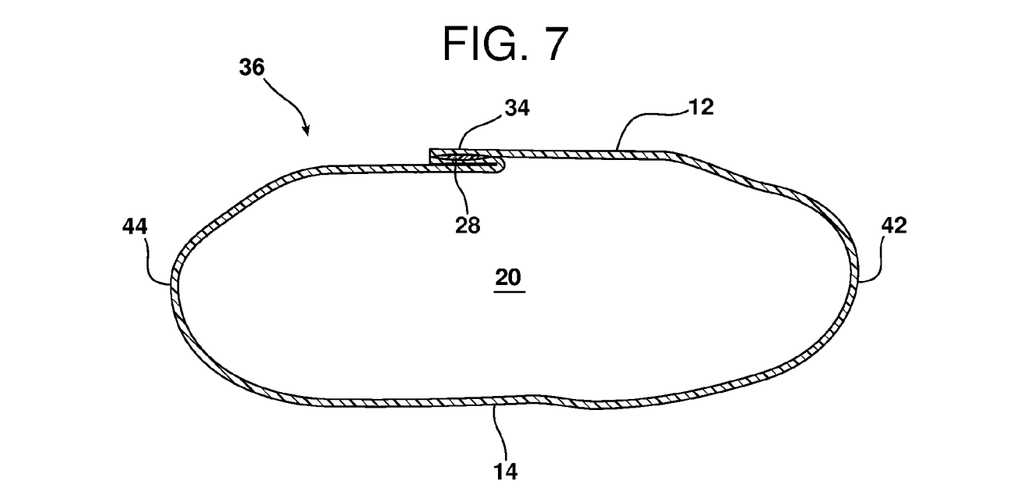
FIG. 7 is a representational cross-sectional view taken along line 7-7 of FIG. 6.

For example, the first film 12 may be heat sealed to the second film 14 around a periphery sealing area 16 to create package 10 such that the first film and the second film may be distinct films having different compositions, structures, and thicknesses. (FIGS. 1-3.) Alternatively, the first and second films may have any, or all, of the same composition, structure, and/or thickness. Where the first film and the second film have the same composition, structure, and thickness, then for example a continuous web of material may be folded over and heat sealed along three edges 16 to create a closed package 30 (e.g., a pouch or bag) having heat seals along three edges and a fold edge 32 defining a fourth edge between the first and second films. (FIGS. 4-5.) Also, the web of material may be made (i.e., extruded) in a tubular shape, or supplied in a flat configuration and folded over and sealed together along a longitudinal heat seal seam 34 (e.g., a fin seal or a lap seal arrangement) to create a tubular shape, followed by heat sealing opposing ends 38, 40 to close the package 36 so that the package may have two edges 42, 44 formed by the folded over web and two edges formed by the end seals 38, 40 to define the first film 12 and the second film 14. (FIGS. 6-7.)

Figure 9:
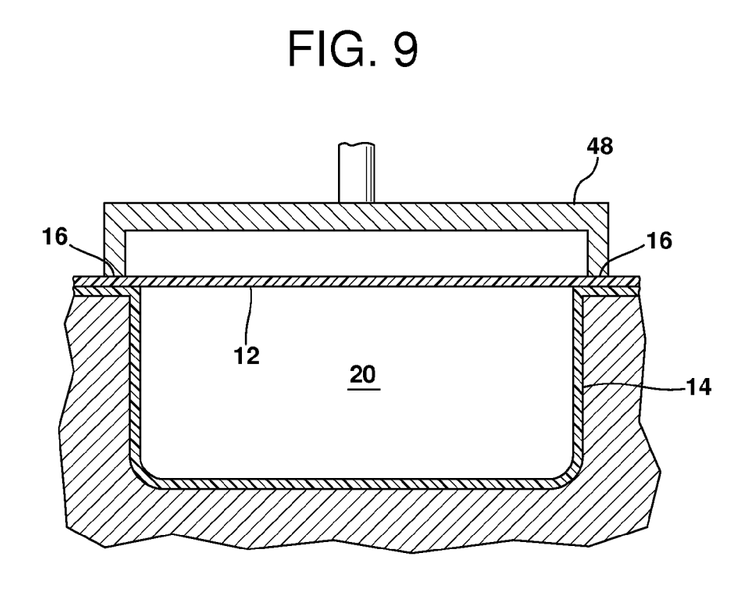
FIG. 9 is a representational cross-section of perimeter heat seal platen 48.
Figure 10:
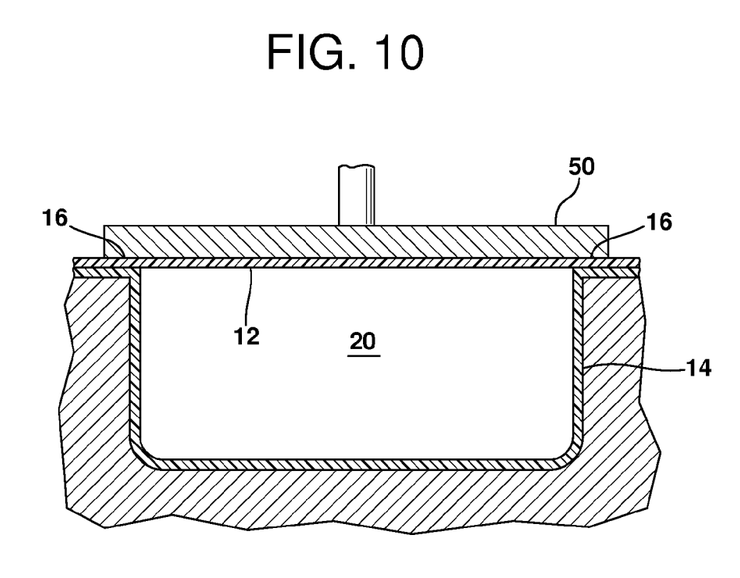
FIG. 10 is a representational cross-section of total heat seal platen 50.

In the unit operation of heat sealing the first film to the second film, the heat seal platen utilized may be a perimeter ("peripheral") sealing platen 48 (FIG. 9) or may be a total ("all-over") sealing platen 50 (FIG. 10). A total sealing platen 50 is adapted to contact the film (e.g., first film 12) broadly across the surface of the film in creating the heat seal, thereby transferring heat directly to a majority of the surface of the film of the package that the platen contacts. A perimeter sealing platen 48 is adapted to contact the film (e.g., first film 12) relatively narrowly across the surface of the film in creating the heat seal, for example, contacting the film effectively only in the heat seal region 16 adjacent where the heat seal is formed, thereby transferring heat to a minority of the surface of the film of the package that the platen contacts.

Such platens may be used in the heat sealing unit operation of a thermoforming vacuum-packaging machine such as those available from Multivac Corporation. In the embodiments illustrated in FIGS. 9-10, the first film 12 may be considered the "lid" or "non-formed web" and the second film 14 may be considered the "formed web." However, the first and second films may be configured in the reverse configuration such that second film 14 is the non-formed web and first film 12 is the formed web.

In the thermoforming vacuum packaging process, the film to be formed may be heated before the forming step in order to cause the film to become more pliant (e.g., heat-softened) for the subsequent forming step. The film may be heated to a film thermoforming temperature of at least about, and/or at most about, any of the following temperatures: 45, 50, 55, 60, 65, 70, 80, 90, 95, 100, 105, and 110° C. The film may be heated by exposure to, or use of, one or more of a water bath, hot air tunnel, or infrared radiation heaters.

Subsequent to the heating step, the film may be formed (i.e., thermoformed) to change the shape of the film to a desired shape, for example, by pulling or drawing the heated film down onto a mold surface. The film may be formed, for example, by the use of any of one or more of vacuum forming, air assist vacuum forming, plug assist vacuum forming, and drape forming. The resulting formed web may be shaped to the configuration of a packaging component, for example, such as any of a tray or a formed pocket useful, for example, in a horizontal form, fill, seal (HFFS) application.

A food product (e.g., meat, such as red meat, chicken, pork, soup, sauces, pasta) may be placed in or on the formed web packaging component. A lid or other closure may be placed to cover the filled formed web pockets or trays. The air may be evacuated from the sealing die and protective gas may be added. The package is sealed closed by heat sealing the lid film to the formed film to enclose the food product within a package and create a packaged food. The package is cut from the web. It is possible for the formed web to be sealed to itself to close the package.

A package comprising the first and second films may be used in packaging an article or object, for example, packaging food, where the food packaging may be exposed to microwave or conventional oven conditions or both to heat or cook the food. Such food may comprise for example, fresh, raw, partially-cooked, or cooked food, such as meat, such as red meat products (e.g., beef, veal, lamb, and pork), poultry, and pre-prepared products such as pizza and pasta. Any of the above-described food may be enclosed in a package comprising the first and second films, as described above. The food may then be heated, reheated, or cooked by placing the food enclosed in the package in an oven and activating the oven to heat or cook the food enclosed in the package to a desired level.

The following examples are presented for the purpose of further illustrating and explaining various embodiments the present invention and are not to be taken as limiting in any regard. Unless otherwise indicated, all parts and percentages are by weight.

The following abbreviations may be used:

"PA1-6" is a nylon-6 having a melting point of 220° C. available from BASF Corporation under the Ultramid B40 LN01 trade name.

"PA2-6" is a nylon-6 having a melting point of 220° C. available from BASF Corporation under the Ultramid B40 trade name.

"PA1-6,6" is a nylon-6,6 having a melting point of 260° C. available from Solutia Corporation under the Vydyne 65A trade name.

"PA1-6/6,6" is a nylon-6/6,6 copolymer having a melting point of 196° C. available from BASF Corporation under the Ultramid C33 trade name.

"PA1-6,6/6,10" is a nylon-6,6/6,10 having a melting point of 205° C. available from EMS-Grivory Corporation under the Grilon BM20 SBG Natural trade name.

"MB1" is an antiblock masterbatch of silica in nylon-6.

"MB2" is an antioxidant masterbatch of copper salt in nylon-6.

"MB3" is a slip agent masterbatch of polydimethylsiloxane in nylon-6.

"MB4" is a heat stabilizer masterbatch of potassium and copper iodide in nylon-6/6,6 available from Solutia Corporation under the NA 189 trade name.

"EMA1" is an ethylene/methyl acrylate copolymer believed to have 24 wt. % methyl acrylate comonomer content, a melting point of 91° C., and a density of 0.94 available from DuPont Corporation under the Elvaloy AC1224 trade name.

"Ionomer1" is an ionomer and polyamide blend available from DuPont Corporation under the Surlyn AM7927 trade name and having a melting point of 94° C., more specifically believed to comprise about 50% zinc-neutralized ethylene/methacrylic acid blended with about 50% polyamide, by weight of the blend.

Preparation of the Sample Films

Films having a 4.2 mil thickness and an 8 mil thickness were made by a flat cast co-extrusion process to have the compositions shown in the following tables. For each of the sample films, the 4.2 mil thick film may be referred to in this section of the application as the top film (or non-formed web) and the 8 mil thick film may be referred to in this section of the application as the bottom film (or the formed web).

Sample 1 Film

| Layer | Thickness % of total | PA1-6/6,6 (wt. % of layer) | PA1-6 | PA1-6,6 | PA1-6,6/6,10 | MB1 | MB4 |
|---|---|---|---|---|---|---|---|
| 1st | 12 | 71% | 20% | | | 8% | 1% |
| 2nd | 68 | | 25% | 55% | 20% | | |
| 3rd | 20 | | 24.3% | 55% | 20% | | 0.7% |

Sample 2 Film

| Layer | Thickness % of total | PA1-6/6,6 (wt. % of layer) | PA1-6 | PA1-6,6 | PA1-6,6/6,10 | EMA1 | MB1 | MB2 | MB3 |
|---|---|---|---|---|---|---|---|---|---|
| 1st | 12 | 69.5% | | | 20% | | 8% | 2.5% | |
| 2nd | 58 | | 62.5% | | 20% | 15% | | 2.5% | |
| 3rd | 30 | | 24.3% | 55% | 20% | | | | 0.7% |

Sample 3 Film

| Layer | Thickness % of total | PA1-6/6,6 (wt. % of layer) | PA1-6 | PA1-6,6 | PA1-6,6/6,10 | Ionomer1 | MB1 | MB4 |
|---|---|---|---|---|---|---|---|---|
| 1st | 12 | 71% | 20% | | | | 8% | 1% |
| 2nd | 73 | | 60% | | 20% | 20% | | |
| 3rd | 15 | | 24.3% | 55% | 20% | | | 0.7% |

Sample 4 Film

| Layer | Thickness % of total | PA1-6/6,6 (wt. % of layer) | PA1-6 | PA1-6,6 | PA1-6,6/6,10 | EMA1 | MB1 | MB4 |
|---|---|---|---|---|---|---|---|---|
| 1st | 12% | 71% | 20% | | | | 8% | 1% |
| 2nd | 68% | | 64% | | 20% | 15% | | 1% |
| 3rd | 20% | | 24.3% | 55% | 20% | | | 0.7% |

Sample 5 Film

| Layer | Thickness % of total | PA1-6/6,6 (wt. % of layer) | PA1-6 | PA1-6,6 | PA1-6,6/6,10 | Ionomer1 | MB1 | MB4 |
|---|---|---|---|---|---|---|---|---|
| 1st | 12 | 71% | 20% | | | | 8% | 1% |
| 2nd | 73 | | 59% | | 20% | 20% | | 1% |
| 3rd | 15 | | 24.3% | 55% | 20% | | | 0.7% |

Sample 6 Film

| Layer | Thickness % of total | PA1-6/6,6 (wt. % of layer) | PA1-6 | PA2-6 | PA1-6,6 | PA1-6,6/6,10 | Ionomer1 | MB1 | MB3 | MB4 |
|---|---|---|---|---|---|---|---|---|---|---|
| 1st | 12 | 71% | 20% | | | | | 8% | | 1% |
| 2nd | 58 | | | 79% | | 20% | | | | 1% |
| 3rd | 30 | | | | 59.3% | 20% | 20% | | 0.7% | |

Sample 7 Film

| Layer | Thickness % of total | PA1-6/6,6 (wt. % of layer) | PA1-6 | PA1-6,6 | PA1-6,6/6,10 | MB1 | MB2 | MB3 |
|---|---|---|---|---|---|---|---|---|
| 1st | 12 | 69.5% | | | 20% | 8% | 2.5% | |
| 2nd | 58 | | 25% | 55% | 20% | | | |
| 3rd | 30 | | 24.3% | 55% | 20% | | | 0.7% |

Impact Testing

The Sample 1 and 3-6 films were tested according to ASTM D3763-08 to gauge the performance of the films at impact velocities as well as the rate sensitivity to impact. The tests were conducted at least one week after manufacture of the films. The results are set forth in Table A below.

TABLE A

|  |  | Peak Load (pounds force) | | | |
| --- | --- | --- | --- | --- | --- |
|  | Modifier | 4.2 mil 40° F. | 4.2 mil 73° F. | 8 mil 40° F. | 8 mil 73° F. |
| Sample 1 | — | 33.5 | 32.2 | 68.7 | 66.1 |
| Sample 3 | Ionomer1 in interior layer | 30.5 | 31.7 | 69.3 | 69.2 |
| Sample 4 | EMA1 in interior layer | 30.5 | 34.8 | 53.5 | 54.9 |
| Sample 5 | Ionomer1 in interior layer | 32.0 | 38.7 | 67.0 | 71.8 |
| Sample 6 | Ionomer1 in outside layer | 35.4 | 45.5 | 72.5 | 67.8 |

Preparation of Packages 1-5

"Package 1" packages were made by sealing a Sample 1 top film to a formed Sample 1 bottom film. The packages were made using a Multivac R530 horizontal rollstock thermoform vacuum-packaging machine having the sealing die temperature setting of 210° C., a 2-second seal time, a 2-second forming time, and a 2.5 inch pocket depth. A total ("all-over") sealing platen was used to seal a two by two grid of packages at a time. Each package had a length of 175 mm and a width of 140 mm. The seal width was 5 mm. The top and bottom films were arranged so that the first layer of the top film contacted the first layer of the bottom film in forming the heat seal. Each package enclosed from 1.5 to 2 lbs of a hydrogel formed by mixing potassium polyacrylamide acrylate copolymer (Terra-Sorb hydrogel) with water at a ratio of one gallon of water to ⅓ ounce of potassium polyacrylamide acrylate copolymer. The packages were produced in a room having a temperature of from 45 to 50° F.

Package 2 packages were made similar to the procedure used for Package 1 except that the top and bottom films were Sample 3 films and the sealing die temperature setting was 220° C.

Package 3 packages were made similar to the procedure used for Package 1 except that the top and bottom films were Sample 4 films.

Package 4 packages were made similar to the procedure used for Package 1 except that the top and bottom films were Sample 5 films.

Package 5 packages were made similar to the procedure used for Package 1 except that the top and bottom films were Sample 6 films.

Immediate Drop Test

At least within 10 minutes of the creation of the packages, a "drop test" was completed for the packages using the following procedure. After the packages were made in the room having a temperature of from 45 to 50° F., the packages were moved to a room having a temperature of from 68 to 77° F. to conduct the drop test. Three boxes enclosing 8 packages per box were prepared as follows. Eight packages were placed in a standard corrugated box such that there were 4 packages as a bottom layer in the box and 4 packages as a top layer resting on the bottom layer of packages. The lid of the box was taped shut. Each of the boxes was dropped to the floor 8 times from a specified height (e.g., 2-foot height or 3-foot height). Each box was then opened to retrieve each package. Each package was hand squeezed to detect whether the package leaked and was then inspected to determine whether the package leak was due to a seal failure caused by the shock of the drop test or by an incomplete seal. If the leak was the result of an incomplete seal—that is, an area of the seal perimeter where the top film and bottom film did not meld to complete a heat seal—rather than a leak caused by a stress induced failure of the heat seal, then that package was excluded from the results tabulation.

For Packages 1-5, the drop test height was 2 feet. The results are shown in Table 1.

TABLE 1

| Packages 1-5 using total seal platen | | | | | |
| --- | --- | --- | --- | --- | --- |
|  | Top film (4.2 mil) | Bottom film (8 mil) | Modifier | Number of failed packages (leakers) | Number of good packages | Failure % |
| Package 1 | Sample 1 | Sample 1 | — | 22 | 2 | 91.7 |
| Package 2 | Sample 3 | Sample 3 | Ionomer1 in interior layer | 21 | 3 | 87.5 |
| Package 3 | Sample 4 | Sample 4 | EMA1 in interior layer | 6 | 18 | 25 |
| Package 4 | Sample 5 | Sample 5 | Ionomer1 in interior layer | 23 | 1 | 95.8 |
| Package 5 | Sample 6 | Sample 6 | Ionomer1 in outside layer | 23 | 1 | 95.8 |

Packages 6-10

Package 6 packages were made similar to the procedure used for Package 1 packages except that a perimeter ("peripheral") sealing platen was used.

Package 7 packages were made similar to the procedure used for Package 6 except that the top and bottom films were Sample 3 films and the sealing die temperature setting was 220° C.

Package 8 packages were made similar to the procedure used for Package 6 except that the top and bottom films were Sample 4 films.

Package 9 packages were made similar to the procedure used for Package 6 except that the top and bottom films were Sample 5 films.

Package 10 packages were made similar to the procedure used for Package 6 except that the top and bottom films were Sample 6 films.

Drop testing was conducted on Packaged 6-10 using the procedures described above. For Packages 1-5 the drop test height was 3 feet. The results are set forth in Table 2.

TABLE 2

| | | | | | | |
|---|---|---|---|---|---|---|
| Packages 6-10 using perimeter seal platen | | | | | | |
| | Top film (4.2 mil) | Bottom film (8 mil) | Modifier | Number of failed packages (leakers) | Number of good packages | Failure % |
| Package 6 | Sample 1 | Sample 1 | — | 8* | 12 | 40 |
| Package 7 | Sample 3 | Sample 3 | Ionomer1 in interior layer | 6 | 18 | 25 |
| Package 8 | Sample 4 | Sample 4 | EMA1 in interior layer | 2 | 22 | 8.3 |
| Package 9 | Sample 5 | Sample 5 | Ionomer1 in interior layer | 1* | 22 | 4.3 |
| Package 10 | Sample 6 | Sample 6 | Ionomer1 in outside layer | 4* | 17 | 19 |

*The packaging having incomplete seals were excluded from the count report of failed packages.

When conducting a similar drop test, but more that 24 hours after the manufacture of the packages, it was found that the failure rate for Packages 6 type of packaging was essentially 0%.

Packages 11-17

Package 11 packages were made similar to the procedure used for Package 6.

Package 12 packages were made similar to the procedure used for Package 6 except that the top and bottom films were Sample 5 films and the sealing die temperature setting was 208° C.

Package 13 packages were made similar to the procedure used for Package 6 except that the top film was Sample 5 film and the bottom film was Sample 1 film.

Package 14 packages were made similar to the procedure used for Package 6 except that the top film was Sample 4 film and the bottom film was Sample 1 film.

Package 15, Package 16, and Package 17 packages were made similar to the procedure used for Package 14 except that the sealing die temperature settings were 215° C., 220° C., and 225° C., respectively.

Drop testing was conducted on Packages 11-17 using the procedures described above and a drop test height of 3 feet. The results are set forth in Table 3.

TABLE 3

Packages 11-17 using perimeter seal platen

|  | Top film (4.2 mil) | Bottom film (8 mil) | Modifier | Seal die head temp. ° F. | Number of failed packages (leakers) | Number of good packages | Failure % |
|---|---|---|---|---|---|---|---|
| Package 11 | Sample 1 | Sample 1 | — | 210 | 7 | 17 | 29% |
| Package 12 | Sample 5 | Sample 5 | Ionomer 1 in interior layer | 208 | 2* | 17 | 11% |
| Package 13 | Sample 5 | Sample 1 | Ionomer1 in interior layer of NFW** | 210 | 1* | 20 | 5% |
| Package 14 | Sample 4 | Sample 1 | EMA1 in interior layer of NFW | 210 | 2* | 20 | 9% |
| Package 15 | Sample 4 | Sample 1 | EMA1 in interior layer of NFW | 215 | 0 | 24 | 0% |
| Package 16 | Sample 4 | Sample 1 | EMA1 in interior layer of NFW | 220 | 0 | 24 | 0% |
| Package 17 | Sample 4 | Sample 1 | EMA1 in interior layer of NFW | 225 | 1 | 23 | 4% |

*The packaging having incomplete seals were excluded from the count report of failed packages.
**NFW is non-formed web.

When conducting a similar drop test, but more that 24 hours after the manufacture of the packages, it was found that the failure rate for Packages 11 type of packaging was essentially 0%.

Packages 18-19

Package 18 packages were made similar to the procedure used for Package 6 packages except that the top and bottom films were Sample 2 films and the packaged material was 2 pounds of pork rather than hydrogel.

Package 19 packages were made similar to the procedure used for Package 18 packages except that the top film was Sample 1 film and the bottom film was Sample 7 film.

Drop testing was conducted on Packages 18-19 using the procedures described above and a drop test height of 3 feet. The results are set forth in Table 4.

TABLE 4

Packages 18-19 using perimeter seal platen

|  | Top film (4.2 mil) | Bottom film (8 mil) | Modifier | Number of failed packages (leakers) | Number of good packages | Failure % |
|---|---|---|---|---|---|---|
| Package 18 | Sample 2 | Sample 2 | EMA1 in interior layer | 54 | 474 | 10% |
| Package 19 | Sample 1 | Sample 7 | — | 44 | 52 | 46% |

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by this reference.

What is claimed is:

1. A package comprising: a heat seal between a first film and a second film wherein: the first film comprises: at least 70% by weight of the first film of one or more polyamides; and at least one modified interior layer comprising: at least 70% by weight of the modified interior layer of one or more polyamides; and one or more modifiers selected from ethylene/alkyl (meth)acrylate copolymers; and the second film comprises at least 70% by weight of the second film of one or more polyamides and wherein the ethylene/alkyl (meth)acrylate copolymer comprises at least 20% alkyl (meth)acrylate monomer content based on the weight of the copolymer.

2. A package comprising: a heat seal between a first film and a second film wherein: the first film comprises: at least 70% by weight of the first film of one or more polyamides; and at least one modified interior layer comprising: at least 70% by weight of the modified interior layer of one or more polyamides; and one or more modifiers selected from ethylene/alkyl (meth)acrylate copolymers; and the second film comprises at least 70% by weight of the second film of one or more polyamides and wherein the ethylene/alkyl (meth)acrylate copolymer comprises methyl acrylate monomer content of at least 18% based on the weight of the copolymer and the ethylene/alkyl (meth)acrylate copolymer has a melting temperature of at least 92° C.

* * * * *